May 26, 1964    H. A. LUDEWIG ETAL    3,134,143
MOLD FOR MAKING ELASTIC SOLID TIRES, FRICTION
WHEELS AND OTHER WHEELS
Filed Aug. 14, 1961

INVENTOR

BY his ATTORNEY

United States Patent Office 3,134,143
Patented May 26, 1964

3,134,143
MOLD FOR MAKING ELASTIC SOLID TIRES, FRICTION WHEELS AND OTHER WHEELS
Heinz Adolf Ludewig and Fritz Koch, Hannover, Germany, assignors to Continental Gummi-Werke Aktiengesellschaft, Hannover, Germany
Filed Aug. 14, 1961, Ser. No. 131,233
Claims priority, application Germany Aug. 16, 1960
3 Claims. (Cl. 18—42)

The present invention relates to the manufacture of elastic solid tires or the like. More specifically, the present invention concerns a mold, preferably a casting mold, for the manufacture of solid tires, friction wheels, caterpillar track guiding wheels, or the like with one or more annular reinforcements. In particular, the mold comprises an inner mold portion and an outer mold portion while between said two mold portions there is arranged the proper chamber for molding the solid tires or wheels above referred to.

With molds of this type it is difficult so to mount the annular reinforcements that during the molding operation changes in the position of these reinforcing inserts will not occur.

In addition thereto, difficulties are encountered when the solid tires or wheels have to be removed from the mold. These difficulties exist in particular when the tires, wheels, or the like have a shape which deviates from a hollow cylindrical shape.

It is, therefore, an object of the present invention to provide a mold for making elastic solid tires, friction wheels, caterpillar track guiding wheels and the like, which will overcome the above mentioned drawbacks.

It is another object of this invention to provide a mold of the type set forth in the precering paragraph, which will make it possible safely to mount the annular reinforcing inserts in the mold while permitting an easy removal of the molded tire.

These and other objects and advantages of the invention will appear more clearly from the following specification in connection with the accompanying drawing, in which.

Figure 1:
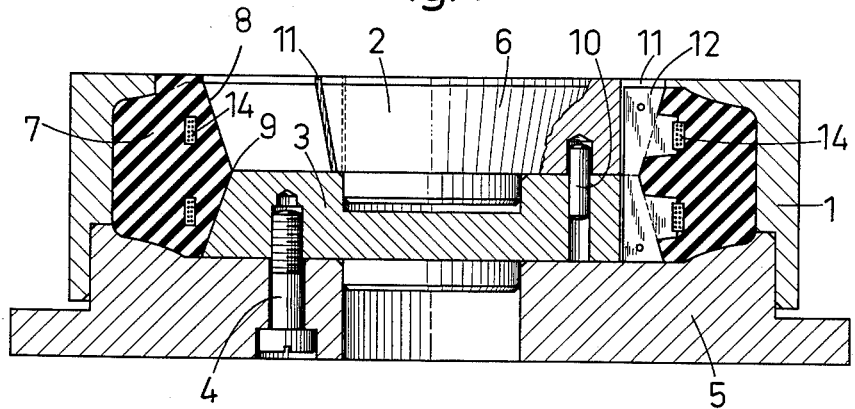
FIG. 1 illustrates a casting mold for elastic solid tires, annular covers of friction wheels, caterpillar track guiding wheels or the like, while the inner surfaces of such tires and covers are designed conically, especially in form of a double cone.
Figure 2:
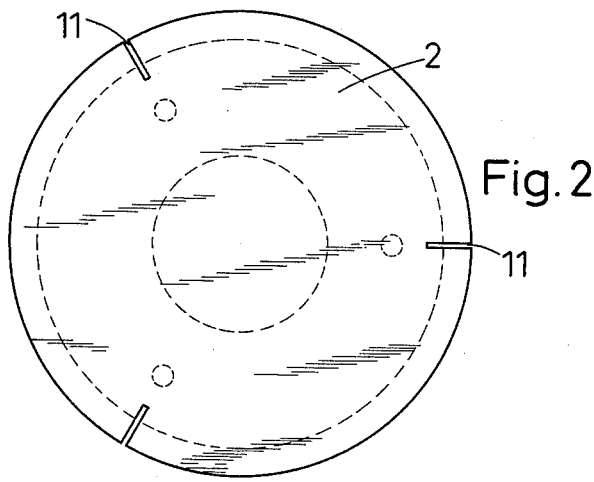
FIG. 2 is a top view of the mold inner part for the mold according to FIG. 1.
Figure 3:
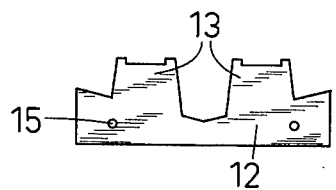
FIG. 3 is a view of an element for the mold according to FIG. 1 for holding reinforcing means for the article to be made.

The objects outlined above have been realized according to the present invention by providing protrusions which extend into the mold chamber and serve for supporting and mounting the annular reinforcing inserts. Furthermore, these protrusions have been designed as thin-walled bodies which are axially displaceably arranged on the inner mold portion and are preferably mounted on the inner mold portion by means of a slit.

Referring now to the drawing in detail, the mold illustrated therein comprises an outer annular mold member 1 and an inner annular mold member 2 the lower portion 3 of which is connected to the bottom portion 5 of the mold by means of screws 4 or the like. The outer surface of the upper mold portion 6 and the lower mold portion 3 of the inner mold member 2 are shaped in conformity with the double cone shape of the tire 7 or its inner surface 8. More specifically, the arrangement is such that the division of the mold portions 3 and 6 is located at the edge 9 of the surface 8. The upper portion 6 is detachably mounted on the lower portion 3 and is secured against rotation by means of pins 10. Furthermore, the upper portion 6 may be provided with handles or the like (not shown) by means of which the upper portion 6 may be lifted off.

The inner mold member 2 is provided with slits 11 uniformly distributed over the circumference and extending in axial direction of mold member 2, said slits 11 preferably also extending radially. These slits 11 serve for mounting abutments or holders 12 which may consist of steel sheet metal. The abutments 12 are provided with protrusions 13 for securing the positioning of annular reinforcing inserts 14 for the tires or wheels to be made. These reinforcing inserts 14 consist of wire packets. The abutments 12 have a wall thickness of approximately 1 millimeter.

After the reinforcing inserts 14 have been mounted on the protrusion 13 in the mold, the casting operation is effected by filling the respective material, preferably polyurethane or polyamide, in castable condition into the mold. During this casting operation, the reinforcing inserts 14 will due to the positive mounting on the protrusions 13 not undergo any changes in their position. After the material has solidified, first the mold outer annular member 1 is withdrawn, whereupon the upper portion 6 of the inner mold member 2 is lifted off. This lifting off movement of the upper portion 6 is possible due to the mounting of the abutments 12 in the slits 11. Thereupon, the tire 7 is removed from the mold or bottom portion 5 and the lower mold portion 3. The lifting off movement necessary to this effect brings about that also the abutments 12 will follow the tire 7, i.e. will likewise be separated from the bottom portion 5 and the lower portion 3. When the tire 7 is free, the abutments 12 can be withdrawn from the tire 7. To aid in this operation, bores 15 are provided into which a withdrawing tool may be inserted.

The slits which will be produced in the body of the tire 7 by the protrusions 13 may, if desired, be filled-in after completion of the tire. However, if desired, the slits may also be left in their respective shape. In most instances of application of the tires or wheels, these slits are without importance inasmuch as they are in the foot portion of the tires or wheels and have only a very narrow width.

As will be evident from the above, the abutments referred to above will assure the positioning of the annular reinforcing inserts while the completed products can be removed from the mold without difficulties inasmuch as during the removal of the completed product the said abutments will follow the removal of said completed product. As will also be evident from the above, the removal of the abutments from the completed product is easily effected after the completed products has been removed from the mold.

It is, of course, to be understood that the present invention is, by no means, limited to the particular construction shown in the drawing but also comprises any modifications within the scope of the appended claims.

What we claim is:

1. A mold assembly for casting solid tires, wheels and like articles with reinforcing inserts therein, which comprises: a mold base member, outer mold means detachably mounted on said base member, inner mold means arranged within said outer mold means and confining therewith an annular chamber shaped in conformity with the article to be cast, said inner mold means having the outer marginal portion thereof provided with substantially radially and axially extending slits, and holding means detachably mounted in said slits and provided with means protruding outwardly from said inner mold means into said annular chamber and having a plurality of axially spaced recesses for receiving and holding reinforcing means to be incorporated in the article to be cast, said holding means being detachable from said inner mold means in assembled condition of said inner mold means to thereby, following the casting of the respective article and the removal of said outer mold means from said base member, make possible the removal of said cast article together with said holding means as a unit from said inner mold means and the subsequent removal of said holding means from said cast article by radially moving said holding means inwardly of said cast article.

2. A mold assembly for casting solid tires, wheels and the like articles with reinforcing inserts therein, which comprises: outer mold means, inner mold means assembled within said outer mold means for a casting operation, said inner and outer mold means confining with each other an annular chamber shaped in conformity with the article to be cast, said inner mold means having its outer peripheral portion provided with narrow slits, and thin-walled holding means movably mounted in said slits for movement in axial direction of said inner mold means and provided with radially outwardly protruding extension means extending from said inner mold means into said annular chamber, each of said extension means having a plurality of axially spaced recesses for receiving and holding reinforcing means to be incorporated in the article to be cast, said holding means being detachable from said inner mold means with the latter in assembled position for a casting operation.

3. A mold assembly for casting solid tires, wheels and the like articles with reinforcing inserts therein, which comprises: a bottom member, an outer mold member detachably mounted on said bottom member, a first inner mold member radially spaced from said outer mold member and connected to said bottom member, a second inner mold member radially spaced from said outer mold member and detachably mounted on said first inner mold member, said first and second inner mold members confining with said outer mold member and said bottom member an annular chamber contoured in conformity with the contour of the article to be cast, said first and second inner mold members having their outer marginal portions provided with aligned slits extending in radial direction, and a plurality of thin-walled holding means slidably mounted in said slits, each of said holding means being provided with holding portions protruding into said annular chamber and having a plurality of axially spaced recess means for receiving and holding inserts to be incorporated in the article to be cast, said holding means being detachable from said first and second inner mold members in assembled condition of said second inner mold member on said first inner mold member.

References Cited in the file of this patent
UNITED STATES PATENTS

| | | |
|---|---|---|
| 1,597,761 | Burt | Aug. 31, 1926 |
| 1,830,676 | Remark | Nov. 3, 1931 |
| 1,914,487 | Carter | June 20, 1933 |
| 2,949,635 | Chiero | Aug. 23, 1960 |

FOREIGN PATENTS

| | | |
|---|---|---|
| 744,907 | Great Britain | Feb. 15, 1956 |